3,185,667
HALOMETHYLATED ADHESIVE COMPOSITION
George W. Ayers, Chicago, and William C. Allinder, Arlington Heights, Ill., assignors to The Pure Oil Company, Chicago, Ill., a corporation of Ohio
No Drawing. Filed Feb. 3, 1960, Ser. No. 6,362
The portion of the term of the patent subsequent to January 29, 1980, has been disclaimed
11 Claims. (Cl. 260—67)

This invention relates to a new adhesive composition and a method of preparing same. More particularly, this invention relates to the unexpected finding that the halomethylation process disclosed in copending application Serial Number 855,257, filed November 25, 1959, now U.S. Patent No. 3,076,039, entitled Process and Product, by the instant inventors, produces a product having adhesive properties when the proportions of formaldehyde or formaldehyde-producing substance and phosphorus oxyhalide are increased per unit weight of aromatic extract, as opposed to the oily, non-adhesive product described therein. More specifically, this invention relates to the adhesive product produced by reacting the reactable portions of mineral lubricating oils, particularly the complex aromatic compounds present in solvent extracts, with at least one and one-half moles of formaldehyde, or equivalent formaldehyde-producing substance, and at least one-half mole of a phosphorus oxyhalide with one mole of the solvent extract or fraction thereof. A portion of the formaldehyde, or formaldehyde-producing substance, and the phosphorus oxyhalide appears to be utilized in condensing aromatic and/or heterocyclic rings through methylene groups (—$CH_2$—); this condensation results in the production of a halomethylated product of higher molecular weight which has adhesive properties.

According to said copending application, halomethylation as applied to form iodo-, bromo-, and chloromethylated products is of value in organic synthesis because the —$CH_2Cl$ group, as an example, can be easily converted to other groups such as —$CH_2OH$, —CHO, —$CH_2CN$, and —$CH_3$. It is known in the art that simple aromatic compounds, such as benzene and naphthalene, can be chloromethylated with formaldehyde (or formalin or paraformaldehyde) and hydrogen chloride, or hydrochloric acid plus zinc chloride with sulfuric acid, acetic acid, stannic chloride, or phosphoric acid as the catalyst. In some of these reactions no catalyst is required. Chloromethyl ether, prepared by the reaction of paraformaldehyde, methanol and hydrogen chloride, may be used in place of formaldehyde and hydrogen chloride.

The chloromethylation reaction involves the replacement of a hydrogen atom on a cyclic nucleus of aromatic character by a chloromethyl group in a single operation. Thus, using the classic example of Grassi and Maselli (Gazz. chim. ital., 28, II, 477 (1898)), benzene, hydrogen chloride and paraformaldehyde with zinc chloride as catalyst, react as follows:

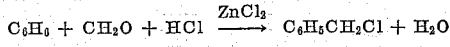

The invention in said copending application is predicated on the discovery that on conducting the reaction of complex aromatic compounds with paraformaldehyde and phosphorus oxychloride to prepare the carbinyl phosphate derivatives, such products were not obtained and, contrary to expectations, the aromatic compounds were chloromethylated. The reaction proceeded at ambient temperatures, i.e., 20° to 105° C., by treatment with paraformaldehyde or the equivalent, and phosphorus oxychloride. This was totally unexpected since a study of the prior art on the reaction of phosphorus oxychloride leads one to expect that a mixture of carbinyl phosphates will be formed. Further investigation of this novel reaction showed that the use of hydrogen chloride in the reaction of the complex aromatic compounds with paraformaldehyde and phosphorus oxychloride did not increase the yield of the chloromethylated product. In accordance with the present invention, when a large excess of phosphorus oxyhalide and formaldehyde (or formaldehyde-producing substance) is present, condensation of cyclic nuclei through methylene groups (—$CH_2$—) apparently takes place along with chloromethylation.

The novel process of the instant invention is illustrated by the following generalized representative reactions:

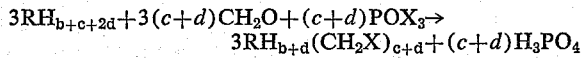

$$nRH_{b+d}(CH_2X)_{c+d} \rightarrow [RH_b(CH_2X)_c(CH_2)_d]_n + ndHX$$

wherein R is a cyclic nucleus of atoms comprising a complex, polynuclear aromatic hydrocarbon or heterocyclic nucleus obtained from the lubricating oil portion of petroleum, particularly from solvent extracts or the reactable portion of solvent extracts as hereinafter more fully defined, H is hydrogen, $b$ is an integer with a value depending upon the specific cyclic structure of R, and is the same as the number of hydrogen atoms attached to the cyclic nucleus that do not enter into the above-mentioned reactions, $c$ is zero or an integer having a value of at least 1, and is the same as the number of hydrogen atoms on the nucleus replaced by halomethyl groups that remain in the adhesive product, $d$ is zero ($c$ and $d$ cannot both be zero in the same compound) or an integer having a value of at least 1, and is the same as the number of hydrogen atoms on the nucleus replaced by halomethyl groups which have reacted to form —$CH_2$— groups during the condensation to the adhesive product, $n$ is an integer from 1 to 10 and is the same as the number of cyclic nuclei condensed with one another in the adhesive product, and X is a halogen, that is, chlorine, bromine, fluorine, or iodine. The product of the foregoing reactions is characterized by its lack of fluidity, water insolubility and unusual adhesive properties.

Accordingly, it becomes a primary object of this invention to provide a composition of matter as defined by the foregoing representative reactions.

Another object of this invention is to provide a process as defined by the foregoing representative reactions.

A more specific object of the invention is to provide a method of making adhesive products from the reactable portions of mineral lubricating oils, particularly the complex aromatic and/or heterocyclic compounds found in solvent extracts.

Another object of this invention is to provide an adhesive product derived from the solvent extracts utilizing a modified halomethylation reaction and/or condensation reaction employing halomethylating agents.

These and other objects of this invention will become apparent or be described as the description proceeds.

In describing this invention, the term "halomethylation" is used to mean the replacement of one or more hydrogen atoms on the complex aromatic and/or heterocyclic compounds by one or more chloromethyl, fluoromethyl, iodomethyl or bromomethyl groups, using such proportions of reactants and such conditions as tend to produce at least a partial condensation thereof. Furthermore, the term "complex aromatic and/or heterocyclic compounds" is intended to mean those complex, high-molecular-weight, aromatic polynuclear hydrocarbons, and heterocyclic compounds having sulfur and/or nitrogen in one or more rings, exhibiting an aromatic character and characterized by being present in small or large proportions in mineral lubricating oils or fractions thereof.

There are numerous limitations to the halomethylation reactions. Terphenyl, for example, resists chloromethylation altogether. Monoalkylbenzene derivatives yield parachloromethyl and lesser amounts of ortho isomers. The presence of a halogen atom on the ring causes the reaction to be more difficult to effect, and low yields result from the chloromethylation of bromobenzene, chlorotoluenes, etc. Nitro groups generally inhibit the reaction. Ketones are unreactive except for acetomesitylene, acetoisodurene and 2,4,6-triethylacetophenone. Phenols react readily and tend to form complex products. Condensation to diarylmethane derivatives occurs in some instances. Accordingly, considering the complex nature of the aromatic compounds with which this invention is concerned, it is unusual to find that these compounds can be successfully halomethylated and/or condensed to produce an adhesive product.

A feature of this invention is the discovery that, in general, compounds of complex aromatic nature can be halomethylated and/or condensed using excessive proportions of phosphorus oxyhalide and formaldehyde, or a formaldehyde-producing agent, to produce an adhesive. This reaction has further been found to apply to the complex, high-molecular-weight, polynuclear aromatic compounds present in solvent extracts from the refining of mineral lubricating oils. Because of the complex nature of these compounds, many of which are characterized by the presence of sulfur, and nitrogen atoms in the nuclei of the molecules, this discovery is considered to be particularly noteworthy.

The starting material represented by $RH_{b+c+2d}$ in the equation comprises those materials of aromatic character obtained in the manufacture and refining of neutral oils and bright stocks during treatment with a selective solvent designed to extract the predominantly aromatic materials from the paraffinic materials. Solvent extracts resulting from the treatment of mineral lubricating oils for the purpose of separating non-aromatic hydrocarbons (the raffinate and finished oil) from the aromatic hydrocarbons and heterocyclics (the extracts and waste product) may be used and are preferred as starting materials.

Since the general process of refining mineral lubricating oils in which solvent extracts are obtained is well-known, it is only necessary for present purposes to describe a typical procedure for obtaining same and give some examples by way of illustration.

In a typical operation, desalted crude oil is first charged to a distillation unit where straight-run gasoline two grades of naphtha, kerosene, and virgin distillate are taken off, leaving a reduced crude residue. The reduced crude is continuously charged to a vacuum distillation unit where three lubricating oil distillates are taken off as side streams, a light distillate is taken off as overhead, and a residuum is withdrawn from the bottom of the tower. The residuum is charged to a propane-deasphalting unit wherein propane dissolves the desirable lubricating oil constituents and leaves the asphaltic materials. A typical vacuum residuum charge to the propane-deasphalting unit may have an API gravity of 12.9°, viscosity SUS at 210° F. of 1249, flash of 585° F., fire of 650° F., and C.R. of 13.9 weight percent, and may be black in color. The deasphalted oil may have an API gravity of 21.5° to 21.8°, viscosity SUS at 210° F. of 165–175, NPA color of 6–7, flash of 575° F., fire of 640° F., and C.R. of 1.7–2.0. The deasphalted oil and various lubricating oil distillates from the reduced crude are subjected to solvent extraction for the separation of non-aromatic from aromatic constituents prior to use. The refined oil or "raffinate" from the extraction processes is used per se; extract, predominating in complex aromatic constituents, is distinctively useful in accordance with this invention.

For example, a crude oil from an East Texas field with an API gravity of 33.1 was topped to remove such light fractions as gasoline, naphtha, kerosene, and a light lubricating distillate. A second lubricating distillate cut was then obtained which had a viscosity of 240 SUS at 100° F., 1.0% sulfur, and an API gravity of 24.5. This oil was treated with phenol to produce a raffinate from which a high-quality lubricating oil could be prepared. The oil extracted by phenol treatment, after removal of phenol, is ready for use as the starting material in accordance with this invention.

Solvents other than phenol may be used to obtain the extraction product used in accordance with this invention, for example, nitrobenzene, chlorex, chlorophenol, cresylic acid, furfural, or the Duo-Sol solution (comprising liquid propane and cresol) may be used. When using phenol, it is possible to vary the characteristics of the extract and raffinate products considerably by adjustment of the amount of water present. A raffinate of relatively low viscosity index can be obtained by using a water solution of phenol during the extraction, and a raffinate of high viscosity index can be obtained by using anhydrous phenol. Following are the physical characteristics of typical extract products, from lubricating oil stocks derived from various crude oils and other source hydrocarbon materials, which may be used in accordance with this invention.

Table I

SOURCES AND PHYSICAL CHARACTERISTICS OF SOLVENT EXTRACTS AND OTHER SOURCE HYDROCARBONS

| Ext. No. | Crude source | Solvent | API grav. | Vis./210° F. | V.I. | ° F. Pour | ° F. Flash | ° F. Fire | Percent C.R. | Percent Sulfur | Average Molecular Wt. |
|---|---|---|---|---|---|---|---|---|---|---|---|
| 1 | East Texas | Phenol | 11.1 | 282 | −40 | +55 | | | 7.2 | 2.66 | |
| 2 | do | do | 15.4 | 285 | +39 | | | | | | |
| 3 | do | do | 12.6 | 310.1 | −1 | +80 | | | 4.7 | 2.27 | |
| 4 | do | do | 14.6 | 313 | +27 | +90 | | | 4.7 | 2.2 | |
| 5 | do | do | 15.4 | 372 | +5 | +60 | | | 4.13 | 2.33 | |
| 6 | do | do | 13.7 | 355 | +27 | +80 | | | | 2.18 | |
| 7 | do | do | 8.6 | 616 | 0 | +70 | | | | | |
| 8 | do | do | 10.5 | 172.1 | −101 | +60 | | | | 2.88 | |
| 9 | Santa Fe Springs | do | 10.2 | 371 | | +65 | 520 | 600 | | | |
| 10 | Texas | Furfural | 13.0 | 1,500 | | +85 | 470 | 515 | | | |
| 11 | Pennsylvania | Chlorex | 12.2 | 1,365 | | +85 | 560 | 630 | | | |
| 12 | do | Nitro benzene | 10.0 | 1,500 | | +75 | 555 | 640 | | | |
| 13 | Mid-Continent | Propanecresol | 14.4 | 1,500 | | +100 | 540 | 605 | | | |
| 14 | do | Phenol | 13.6 | 41.7 | −82 | +20 | | | | | |
| 15 | do | Chlorex | 13.6 | 200 | −61 | +75 | | | | | |
| 16 | do | Phenol | 8.9 | 569 | | +75 | | | | | |
| 17 | do | Furfural | 14.9 | 50.2 | 25 | +20 | | | | | |
| 18 | East Texas | Phenol | 13.5 | 341 | 17 | +65 | 530 | 610 | 5.76 | 2.36 | |
| 19 | do | do | 11.1 | 61.5 | −56 | +40 | 435 | 475 | 0.42 | 2.7 | 340 |
| 20 | do | do | 13.7 | 360 | +25 | +65 | 550 | 630 | 5.5 | 2.3 | 590 |
| 21 | do | do | 7.7 | 71.1 | −128 | +35 | 420 | 495 | 0.86 | 3.2 | 340 |
| 22 | do | do | 7.3 | 796 | −76 | +65 | 520 | 610 | 7.7 | 3.0 | |

The solvent extracts from lubricating oils used as starting materials for this invention have the following general properties and characteristics.

Table II

| Characteristic: | Range of value |
| --- | --- |
| Gravity, ° API | 7.3–18.3. |
| Gravity, sp., 60/60° F. | 0.9446–1.0195. |
| Viscosity SUS at 210° F. | 40–1500. |
| Viscosity index | Minus 153 to plus 39. |
| Pour point, ° F. | 20–115. |
| Color, NPA | +2–5D. |
| Molecular weight, average | Above 300. |
| Sulfur, percent wt. | Above 0.6. |
| Nitrogen, percent wt. | Below 1. |
| Aromatic Compounds percent (including heterocyclics) | 75–98. |
| Av. No. of rings/mean mol. | 1.7–3.5. |

The specific gravities of the extracts in general increase with increase in the viscosity of the raffinate at a constant viscosity index. Stated otherwise, the specific gravities of these extracts increase with decrease in viscosity index of the raffinate at a constant viscosity. For the production of 100±5 V.I. neutral oils, the viscosities of the extracts increase with increase in stated viscosities of the neutral oils (raffinates). The pour points of extracts are high and are affected by changes in the depth of extraction. The sulfur contents are also affected by the depth of extraction. The solvent extracts are characterized by containing aromatic and heterocyclic compounds in the range of 75–98%, the remainder being principally saturates, or material behaving as saturates, together with a minor proportion of up to 7% of organic acids. The organic acids present are not susceptible to extraction by the use of aqueous strong caustic because of the solubility of the alkali metal salts of the acids in the oil. Little or no asphaltic material is present in solvent extracts and they contain essentially no materials volatile at room temperature.

The data shown in Tables I and II are merely illustrative and the invention is not to be limited thereby.

It is apparent that the characteristic of the final halomethylated-condensed product will vary depending on the concentration and types of aromatic starting materials employed. In such complicated mixtures as solvent extracts from lubricating oil fractions, the content of reactable materials may vary from about 30% to 100% by weight of the aromatic and heterocyclic material present.

In carrying out the process of this invention, either formaldehyde or paraformaldehyde may be used. Any formaldehyde polymer yielding substantially anhydrous formaldehyde under the conditions of the process may be employed in this process. We have found that the use of larger porportions of formaldehyde, or formaldehyde-producing reactant, and larger proportions of phosphorus oxyhalide, e.g., phosphorus oxychloride, phosphorus oxyfluoride, phosphorus oxyiodide or phosphorus oxybromide, at temperatures ranging from 40° C. to 115° C. produces a more complicated reaction, characterized by both halomethylation and condensation, to yield a product having adhesive properties. The results of this invention are obtained by using between about 1.5 to 3 moles of formaldehyde, or equivalent formaldehyde-producing agent, and 0.5 to 1.5 moles of phosphorus oxyhalide per mole of solvent extract.

Phosphorus trichloride and phosphorus pentachloride are not effective replacements for phosphorus oxychloride in this process. However, phosphorus oxybromide, phosphorus oxyfluoride or phosphorus oxyiodide may be used to prepare the bromomethylated, fluoromethylated, or iodomethylated condensed adhesive of this invention.

A solvent composed of one or more paraffinic or cycloparaffinic hydrocarbons not susceptible to halomethylation may be used to dissolve the aromatic reactant prior to halomethylation and/or condensation by this process. The solvent used must boil below the initial boiling point of the aromatic reactant so that it can be removed from the high boiling adhesive product by distillation.

This process may be carried out either batchwise or continuously. Whatever operation is used, provision must be made for controlling temperature since the reaction is exothermic. It is carried out best at approximately 40–90° C. Under such conditions, the reactants should be maintained in contact with one another until the exothermic reaction has subsided. This period may be as long as three hours or even longer. Further heating for several hours is conducive to maximum yields.

In order to demonstrate the invention, the following examples are given:

The three runs shown in the following Table III were carried out as follows: A three-neck, 500-l., glass flask was fitted with a mechanical stirrer, thermometer and reflux condenser, and was immersed in a water bath containing water at room temperature. After the indicated quantities of solvent extract and paraformaldehyde had been added to the flask, stirring was started and the phosphorus oxychloride was added in small portions over a ten- to fifteen-minute period. Reaction began at approximately 40° C., with foaming. The temperature of the reaction mixture was carefully adjusted to minimize foaming. After all evidences of reaction had disappeared, the reaction mixture was diluted with benzene, filtered to remove tarry material, and washed with copious amounts of water. The benzene was removed by distillation, leaving a material suitable for use as an adhesive. The product from each of the runs was used to fasten two strips of paper together; in each case, adhesion of the strips was so great that shear separation could not be made by hand.

Table III

ADHESIVE PREPARATION FROM LUBRICATING OIL EXTRACT

| Run No. | 1 | 2 | 3 |
| --- | --- | --- | --- |
| Solvent Extract No. 22 (Table I) | 165.0 | 99.0 | 165.0 |
| Paraformaldehyde (g.) | 36.8 | 22.1 | 27.8 |
| Phosphorus oxychloride (g.) | 61.3 | 36.8 | 46.0 |
| Reaction temperature (° C.) | 40–56 | 40–85 | 40–115 |
| Reaction period (hrs.) | 7¾ | 12¾ | 32¼ |
| Properties of product: | | | |
| Free flowing | No | No | No |
| Tackiness | Very great | Very great | Very great |

The foregoing experiments illustrate the preparation of adhesive products using the increased proportions of phosphorus oxyhalide in relation to solvent extract.

The following example is given to illustrate that the use of about a 1:1.3 mole ratio of solvent extract and formaldehyde (employed as paraformaldehyde) with a 1:0.4 mole ratio of solvent extract to phosphorus oxychloride gives a non-adhesive halomethylated product.

EXAMPLE I

A three-neck, 500-cc. glass flask was fitted with a mechanical stirrer, thermometer, and reflux condenser, and was immersed in a water bath containing water at room temperature. After 165 gms. (0.49 mole) of solvent extract, No. 19 of Table I, and 18.8 gms. (0.63 mole calculated as formaldehyde) of paraformaldehyde had been added to the flask and stirred mechanically, 30.7 gms. (0.2 mole) of phosphorus oxychloride were added in small portions during 10 to 15 minutes, while the stirring was continued. After addition of the phosphorus oxychloride was completed, the water in the bath was heated slowly. When the temperature of the reaction mixture reached approximately 40° C., rapid reaction took place, with foaming, and heating of the water was discontinued. Reaction proceeded during the next three hours, at the end of which time the temperature had reached approximately 77° C. Stirring of the reaction mixture was continued about three hours longer, heating the water bath whenever necessary to maintain the temperature of the mixture in the flask between 53° C. and 79° C. The reaction mixture was diluted with approximately 200 ml. of benzene, filtered to remove a small amount of tarry material, and then washed with water until the water washings were free of chloride ion and no longer gave a test for free mineral acid with methyl orange indicator. The benzene was removed by distillation, leaving a greenish-black, chloromethylated, oily product containing 4.5% chlorine by analysis. This chlorine was reactive toward silver nitrate and represented approximately 50% chloromethylation of the extract. This product exhibited no adhesiveness. To illustrate the preparation of other products, the following non-limiting example is given:

EXAMPLE II

The process of Example I is repeated using 165 gms. (0.49 mole) of solvent extract (No. 19 of Table I) with 36.8 gms. (1.23 mole, calculated as formaldehyde) of paraformaldehyde in the three-neck flask. Instead of phosphorus oxychloride, 40.4 gms. (0.4 mole) of phosphorus oxyfluoride is passed into the mixture in the flask during two hours while the temperature is maintained at 80–90° C. After further heating of the mixture for one hour, dilution with benzene, and further processing as in Example I, a greenish-black solid product is obtained which has adhesive qualities.

The invention has been illustrated by a number of examples using solvent extracts as the source of the complex aromatic hydrocarbons. Such lubricating oil extracts represent a preferred source material for the reaction because not only does the halomethylated product represent a useful intermediate from which further products can be made, but the products also represent the utilization of a material which is ordinarily discarded as a waste product. Solvent extracts are further characterized by their complexity, which gives unique properties to the halomethylated product. The average molecular weight of solvent extracts obtained in the preparation of 180 and 200 vis. neutral oils is about 340. These extracts contain about 75% to 87% of complex aromatic hydrocarbons and heterocyclics of aromatic character having an average of about 2.7 carbon rings per aromatic molecule. The extracts obtained during the manufacture of 156–160 vis. bright stocks contain from 85% to 98% of complex aromatics and heterocyclics, and have an average of about 3.3 rings per aromatic molecule. When a typical solvent extract was subjected to carbon-type analysis using the method of Kurtz, King, Stout, Partikan and Skrabek (Anal. Chem. 28, 1928 (1956)), the results were: $C_a$–39%, $C_n$–30%, and $C_p$–31%. In this analysis, the $C_a$ and $C_n$ include only the carbon atoms in the rings, while $C_p$ includes the carbon atoms present as paraffins and as side chains on the aromatic and naphthene rings. This same extract, No. 19 in Table I, had an average molecular weight of 340, contained 84% aromatics (and heterocyclics of aromatic type), as determined by a silica gel procedure, and showed 16% saturated hydrocarbons, etc., 86.4% carbon, and 10.7% hydrogen.

The complexity of the types of compounds present, as based on these analyses, is illustrated by the following table:

Table III

ESTIMATED CHEMICAL COMPOSITION OF SOLVENT EXTRACTS NOS. 19 AND 21 OF TABLE I

| Type of compound: | Approx. percent in the extract |
|---|---|
| Saturated hydrocarbons | 12.5 |
| Mononuclear aromatics—Substituted benzenes | 25.0 |
| Dinuclear aromatics—Substituted naphthalenes | 30.0 |
| Trinuclear aromatics— | |
|    Substituted phenanthrenes | 10.0 |
|    Substituted anthracenes | 5.0 |
| Tetranuclear aromatics— | |
|    Substituted chrysenes | 0.5 |
|    Substituted benzphenanthrenes | 0.2 |
|    Substituted pyrenes | 0.2 |
| Pentanuclear aromatics—Perylene | 0.01 |
| Sulfur compounds,[1] oxygen compounds, etc. | 16.5 |

[1] Mainly heterocyclic compounds.

Any portion of the reactive aromatic constituents in solvent extracts may be isolated therefrom, or from other sources, to be used as starting materials for the reaction with the formaldehyde, or formaldehyde-producing agent, and the phosphorus oxyhalide. For example, solvent extracts may be distilled and selected fractions thereof used as the starting materials. The content of reactive, complex, polynuclear, aromatic compounds and heterocyclics present in solvent extracts, as illustrating the preferred source material, may vary depending on the type of solvent, the extraction process applied, and the mineral oil treated, although the general types of compounds present in the extract are not so varied. Extracts containing from about 30% to 90% of reactive polynuclear aromatics and heterocyclics of aromatic nature represent a preferred type of starting material.

The adhesive products of this invention may be contacted with clay at elevated temperatures in order to lighten the darkened color. For most purposes wherein the strong adhesive properties of the products of this invention may be utilized, however, the color is of no consequence. Such applications include mastic materials, protective coatings for metals, adhesives used in the fabrication of wood and paper products, asphalt compositions, spray coatings for automobile under-carriages, and as caulking compounds.

As is apparent from the foregoing description, the invention relates to the preparation of halomethylated, more or less condensed, complex aromatic and/or heterocyclic compounds as herein defined, by reaction of one mol of complex hydrocarbons or heterocyclics with 0.5–1.5 moles of phosphorus oxyhalide and 1.5–3.0 moles of formaldehyde, or equivalent formaldehyde-producing agent, whereby an adhesive product results. The process may be carried out by using various mixtures of the stated phosphorus oxyhalides and mixtures of formaldehyde and formaldehyde-producing agents. Mixtures of adhesive products may be produced, e.g., each derived from a separate reaction with a different phosphorus oxyhalide or by using mixed reactants. Having thus described the invention, the only limitations attaching thereto appear in the appended claims.

The embodiments of the invention in which an exclusive property or privilege is claimed are defined as follows:

1. An adhesive halomethylated composition prepared by the reaction of
   (1) about 1 mole of solvent extracts obtained in the solvent refining of mineral lubricating oils using a solvent selective for aromatic compounds,
   (2) at least 0.5 mole of a phosphorus oxyhalide, and
   (3) at least 1.5 moles of an alkanal of the group consisting of formaldehyde and polymers of formaldehyde,
at a temperature of about 40° to 115° C.

2. An adhesive composition in accordance with claim 1 in which said phosphorus oxyhalide is phosphorus oxychloride.

3. An adhesive composition in accordance with claim 1 in which said phosphorus oxyhalide is phosphorus oxybromide.

4. An adhesive composition in accordance with claim 1 in which said phosphorus oxyhalide is phosphorus oxyiodide.

5. An adhesive composition in accordance with claim 1 in which said phosphorus oxyhalide is phosphorus oxyflouride.

6. An adhesive composition in accordance with claim 1 in which about 0.5 to 1.5 moles of said phosphorus oxyhalide and 1.5 to 3.0 moles of said alkanal are used.

7. An adhesive composition in accordance with claim 1 in which the solvent extracts are characterized by the following physical and chemical properties:

| Characteristic— | Range of value |
|---|---|
| Gravity, °API | 7.3–18.3. |
| Gravity, sp., 60/60° F. | 0.9446–1.0195. |
| Viscosity SUS at 210° F. | 40–1500. |
| Viscosity index | Minus 153 to plus 39. |
| Pour point, °F. | 20–115. |
| Color, NPA | +2–5D. |
| Molecular weight, average | Above 300. |
| Sulfur, percent wt. | Above 0.6. |
| Nitrogen, percent wt. | Below 1. |
| Aromatic compounds, percent (including heterocyclics) | 75–98. |
| Av. No. of rings/mean arom. mol. | 1.7–3.5. |

8. An adhesive chloromethylated composition prepared by the reaction of
   (1) about 1.0 mole of solvent extract obtained in the solvent refining of mineral lubricating oils using a solvent selective for aromatic compounds,
   (2) about 0.5 to 1.5 moles of phosphorus oxychloride, and
   (3) about 1.5 to 3.0 moles of formaldehyde,
at a temperature of about 40° to 115° C.

9. Adhesive compounds in accordance with claim 8 in which said solvent extracts are characterized by the following physical and chemical properties:

| Characteristic— | Range of value |
|---|---|
| Gravity, °API | 7.3–18.3. |
| Gravity, sp., 60/60° F. | 0.9446–1.0195. |
| Viscosity SUS at 210° F. | 40–1500. |
| Viscosity index | Minus 153 to plus 39. |
| Pour point, °F. | 20–115. |
| Color, NPA | +2–5D. |
| Molecular weight, average | Above 300. |
| Sulfur, percent wt. | Above 0.6. |
| Nitrogen, percent wt. | Below 1. |
| Aromatic compounds, percent (including heterocyclics) | 75–98. |
| Av. No. of rings/mean arom. mol. | 1.7–3.5. |

10. An adhesive chloromethylated composition prepared by the reaction of
    (1) about 1.0 mole of phenol extract obtained in the phenol extraction of mineral lubricating oils,
    (2) about 0.5 to 1.5 moles of phosphorus oxychloride, and
    (3) about 1.5 to 3.0 moles of paraformaldehyde,
at a temperature of about 80° to 90° C., said mole ratio of paraformaldehyde being based on formaldehyde.

11. An adhesive chloromethylated composition in accordance with claim 10 in which said phenol extract has an average molecular weight of about 340, and contains about 84% of aromatic and heterocyclic compounds of aromatic type.

References Cited by the Examiner

UNITED STATES PATENTS

| 1,425,393 | 8/22 | Laska et al. | 252—78 |
| 2,216,941 | 10/40 | Gleason | 260—674 |
| 2,250,384 | 7/41 | Lincoln et al. | 252—54 |
| 2,342,433 | 2/44 | Smith | 252—49.9 |
| 2,407,087 | 9/46 | Lieber et al. | 252—54 |
| 2,795,571 | 6/57 | Schneider | 252—437 |
| 3,076,039 | 1/63 | Ayers et al. | |

OTHER REFERENCES

Adams et al.: "Organic Reactions," pub. by John Wiley & Sons, New York, N.Y., vol. 1, 1954, pp. 63–90.

Van Waxer: "Phosphorus and Its Compounds," Interscience Pub. Co. (1958), vol. 1, p. 245.

ALPHONSO D. SULLIVAN, *Primary Examiner.*

ALLAN M. BOETTCHER, *Examiner.*